(12) United States Patent
Ishikawa et al.

(10) Patent No.: US 12,384,358 B2
(45) Date of Patent: Aug. 12, 2025

(54) MOVING BODY CONTROL DEVICE, CONTROL METHOD, AND STORAGE MEDIUM

(71) Applicant: HONDA MOTOR CO., LTD., Tokyo (JP)

(72) Inventors: Shota Ishikawa, Tokyo (JP); Shun Iwasaki, Tokyo (JP); Keisuke Oka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 18/210,887

(22) Filed: Jun. 16, 2023

(65) Prior Publication Data

US 2023/0406289 A1    Dec. 21, 2023

(30) Foreign Application Priority Data

Jun. 17, 2022    (JP) .................................. 2022-098080

(51) Int. Cl.
*B60W 30/06* (2006.01)
*B60W 60/00* (2020.01)

(52) U.S. Cl.
CPC ........ *B60W 30/06* (2013.01); *B60W 60/0011* (2020.02); *B60W 2554/4041* (2020.02)

(58) Field of Classification Search
CPC ............ B60W 30/06; B60W 60/0011; B60W 2554/4041; B60W 10/04; B60W 10/18; B60W 10/20; B60W 2420/54; B60W 2710/18; B60W 2710/20; B62D 15/0285
See application file for complete search history.

(56) References Cited

U.S. PATENT DOCUMENTS

| | | | |
|---|---|---|---|
| 2019/0118801 A1* | 4/2019 | Noh ..................... | B60W 30/095 |
| 2019/0137290 A1* | 5/2019 | Levy ..................... | B60Q 1/507 |

FOREIGN PATENT DOCUMENTS

JP    2020-147215 A    9/2020

* cited by examiner

*Primary Examiner* — Abby Y Lin
*Assistant Examiner* — Dylan M Katz
(74) *Attorney, Agent, or Firm* — Paratus Law Group, PLLC

(57) ABSTRACT

A moving body control device includes: an external environment recognition unit configured to acquire recognition data of an external environment; a detection unit configured to detect, based on the recognition data, a following moving body; a search unit configured to search, based on a current position of the moving body and passage information indicating a passage through which the moving body is movable, for a route from the current position to a predetermined parking position; and a control unit configured to move the moving body to the parking position along the found route. When the following moving body is detected while the moving body is moving to the parking position along a first route, the search unit searches for a second route different from the first route, and, when the second route is found, the control unit moves the moving body to the parking position along the second route.

10 Claims, 11 Drawing Sheets

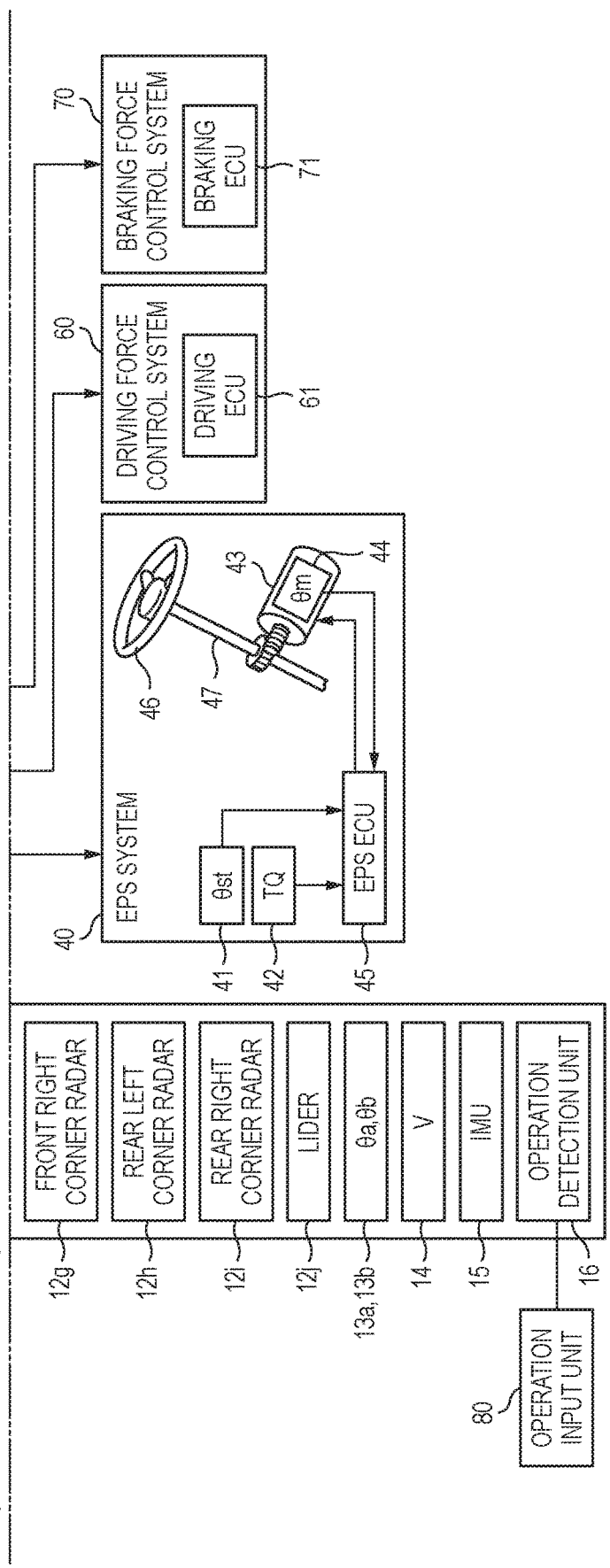

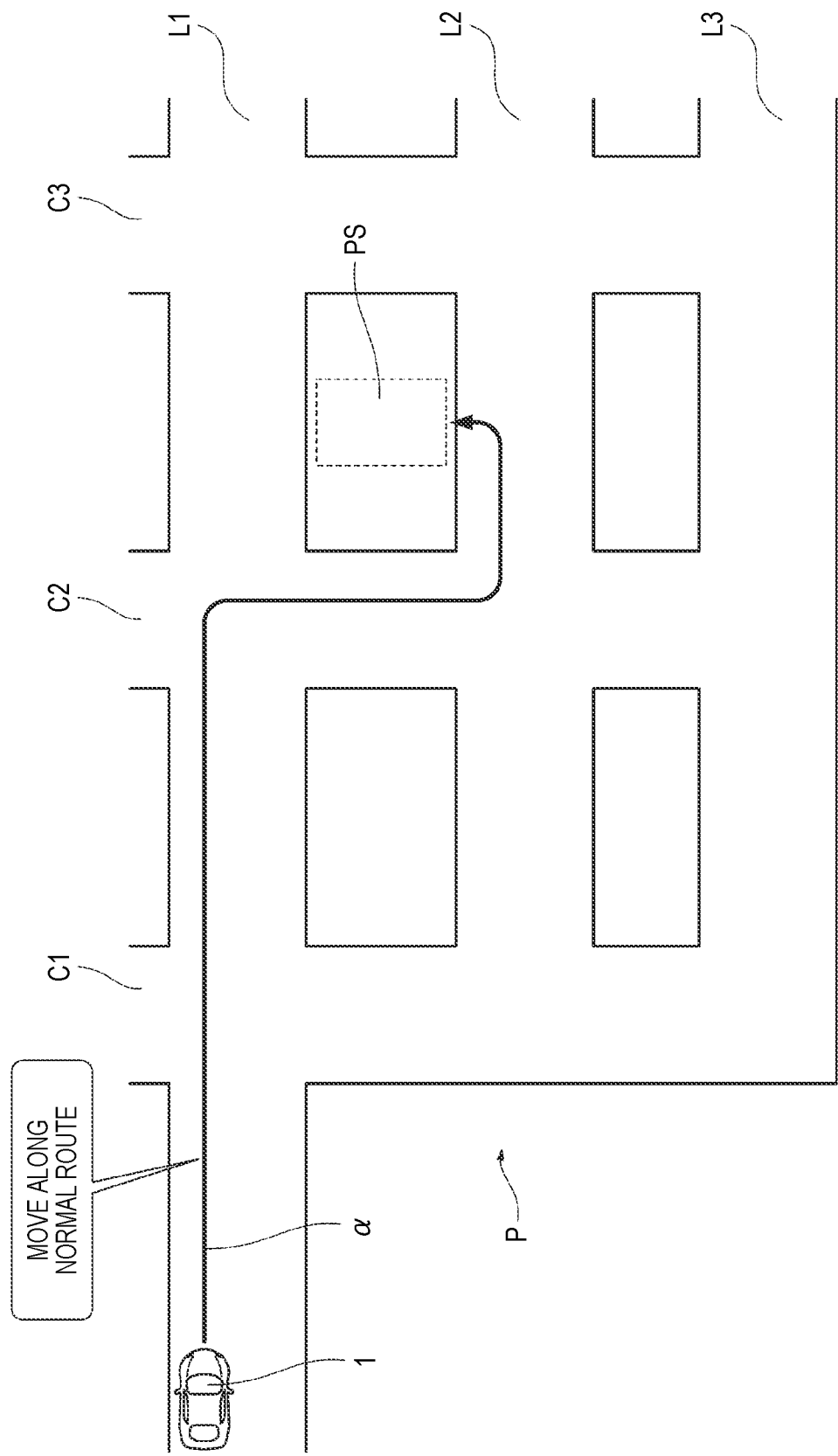

MOVING BODY CONTROL DEVICE, CONTROL METHOD, AND STORAGE MEDIUM

CROSS-REFERENCE RELATED ARTS

This application is based on and claims priority under 35 USC 119 from Japanese Patent Application No. 2022-098080 filed on Jun. 17, 2022.

TECHNICAL FIELD

The present invention relates to a moving body control device, a control method, and a storage medium.

BACKGROUND ART

In recent years, efforts have been actively made to provide access to a sustainable transportation system in consideration of vulnerable people among traffic participants. In order to implement the above object and further improve safety and convenience of traffic, research and development related to automatic driving techniques and driving assistance techniques are in progress.

For example, JP2020-147215A discloses a technique in which, when it is determined that there is a following vehicle in a case where a host vehicle is moved so as to turn along with switchback steering, an operation of turning along with the switchback steering of the host vehicle is restricted, and the following vehicle is allowed to pass first.

SUMMARY

In the related art, there is room for improvement from the viewpoint of performing control of the host vehicle in consideration of the following vehicle. For example, due to an environment around the host vehicle, a space for the following vehicle to pass may not be secured. In such a case, in the related art, the operation of turning along with the switchback steering of the host vehicle is prioritized, and the following vehicle has to wait for the host vehicle to complete the operation of turning along with the switchback steering of the host vehicle.

The present invention provides a moving body control device, a control method, and a storage medium storing a program that can perform control of a moving body in consideration of a following moving body.

According to an aspect of the present disclosure, there is provided a moving body control device configured to control a moving body, including:
  an external environment recognition unit configured to acquire recognition data of an external environment including a surrounding area of the moving body;
  a detection unit configured to detect, based on the recognition data of the external environment, a following moving body that follows the moving body;
  a search unit configured to search, based on a current position of the moving body and passage information indicating a passage through which the moving body is movable, for a route from the current position to a predetermined parking position (parking position PS); and
  a control unit configured to move the moving body to the parking position along the found route, in which
  when the following moving body is detected while the moving body is moving to the parking position along a first route, the search unit searches for a second route different from the first route, and,
  when the second route is found, the control unit moves the moving body to the parking position along the second route.

According to another aspect of the present disclosure, there is provided a moving body control device configured to control a moving body, including:
  an external environment recognition unit configured to acquire recognition data of an external environment including a surrounding area of the moving body;
  a detection unit configured to detect, based on the recognition data of the external environment, a following moving body that follows the moving body;
  a search unit configured to search, based on a current position of the moving body and passage information indicating a passage through which the moving body is movable, for a route from the current position to a predetermined parking position; and
  a control unit configured to assist in moving the moving body to the parking position along the found route, in which
  when the following moving body is detected while the moving body is moving to the parking position along a first route, the search unit searches for a second route different from the first route, and,
  when the second route is found, the control unit assists in moving the moving body to the parking position along the second route.

According to another aspect of the present disclosure, there is provided a control method causing a computer configured to control a moving body to execute processing including:
  acquiring recognition data of an external environment including a surrounding area of the moving body;
  detecting, based on the recognition data of the external environment, a following moving body that follows the moving body;
  searching, based on a current position of the moving body and passage information indicating a passage through which the moving body is movable, for a route from the current position to a predetermined parking position; and
  moving the moving body to the parking position along the found route, in which
  the processing further includes,
  when the following moving body is detected while the moving body is moving to the parking position along a first route, searching for a second route different from the first route, and,
  when the second route is found, moving the moving body to the parking position along the second route.

According to another aspect of the present disclosure, there is provided a non-transitory computer-readable storage medium storing a program causing a computer configured to control a moving body to execute processing including:
  acquiring recognition data of an external environment including a surrounding area of the moving body;
  detecting, based on the recognition data of the external environment, a following moving body that follows the moving body;
  searching, based on a current position of the moving body and passage information indicating a passage through which the moving body is movable, for a route from the current position to a predetermined parking position; and moving the moving body to the parking position along the found route, in which the processing further includes, when the following moving body is detected while the moving body is moving to the parking position along a first route, searching for a second route different from the first route, and, when the second route is found, moving the moving body to the parking position along the second route.

According to the present invention, it is possible to provide a moving body control device, a control method, and a storage medium storing a program that can perform control of a moving body in consideration of a following moving body.

BRIEF DESCRIPTION OF DRAWINGS

FIG. 2 shows a situation in which the host vehicle 1 moves to a parking position PS along a normal route α;

DESCRIPTION OF EMBODIMENTS

Figure 1:
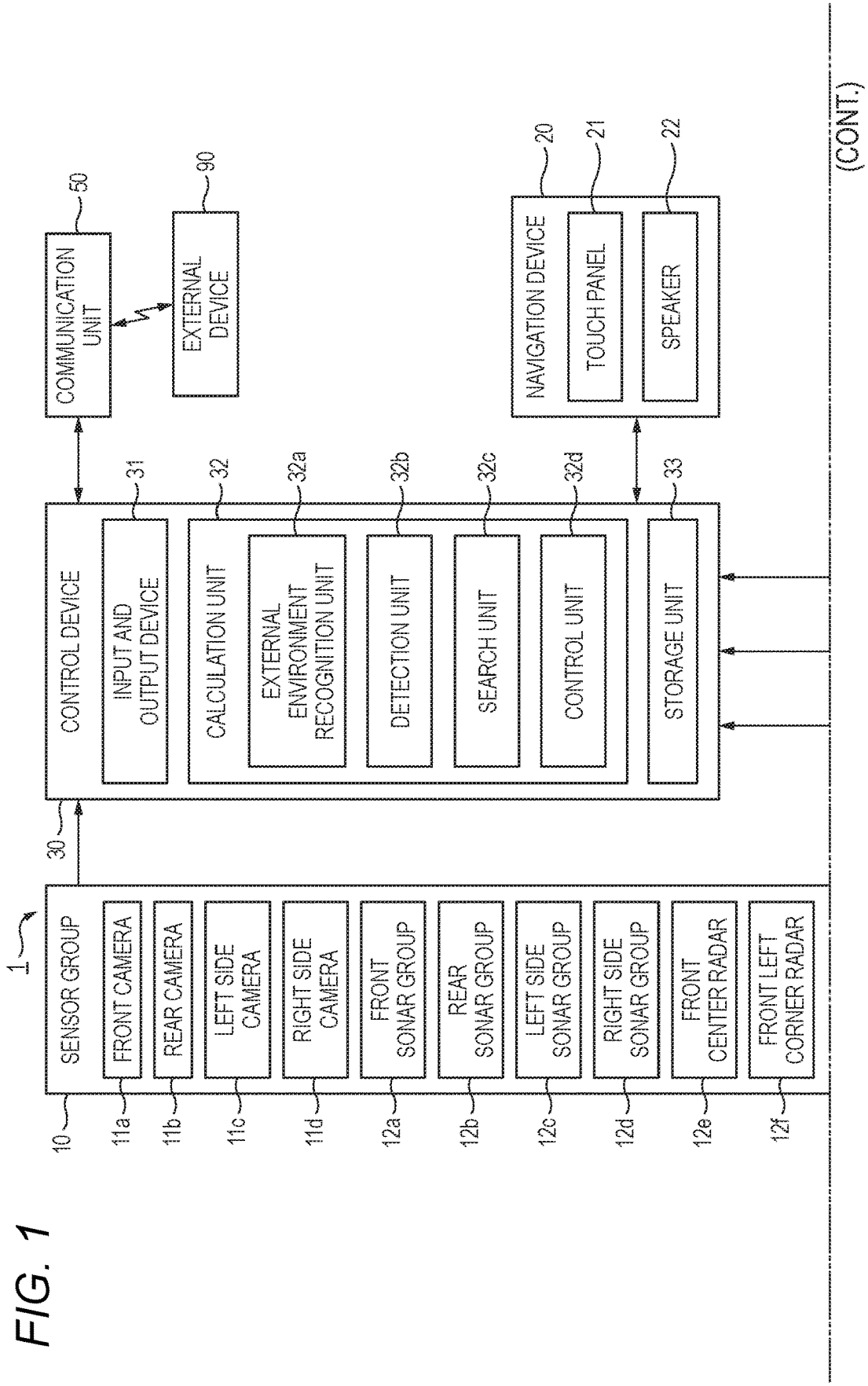
FIG. 1 is a block diagram showing a schematic configuration of a vehicle 1 according to an embodiment.

Hereinafter, an embodiment of a moving body control device, a control method, and a program according to the present invention will be described in detail with reference to the drawings. Hereinafter, an embodiment in which the moving body in the present invention is a vehicle will be described. In this specification and the like, in order to simplify and clarify the description, directions such as front, rear, left, right, up, and down are described according to directions viewed from a user (for example, a driver) that is an occupant of the vehicle. In addition, in the following description, the same or similar elements are denoted by the same or similar reference numerals, and the description thereof may be omitted or simplified as appropriate.

(Vehicle)

A vehicle 1 according to the present embodiment shown in FIG. 1 (hereinafter, also referred to as "host vehicle 1") is an automobile including a drive source, and wheels (all not shown) including drive wheels driven by power of the drive source and steerable wheels that are steerable. For example, the vehicle 1 is a four-wheeled automobile including a pair of left and right front wheels and a pair of left and right rear wheels. The drive source of the vehicle 1 may be an electric motor, an internal combustion engine such as a gasoline engine or a diesel engine, or a combination of an electric motor and an internal combustion engine. In addition, the drive source of the vehicle 1 may drive the pair of left and right front wheels, the pair of left and right rear wheels, or the four wheels including the pair of left and right front wheels and the pair of left and right rear wheels. The front wheels or the rear wheels may be both steerable wheels that are steerable, or either of the front wheels or of the rear wheel may be a steerable wheel.

The vehicle 1 is configured to be movable by automatic steering toward a target position specified by the user. As the target position, a predetermined parking position (parking space) may be set. That is, the vehicle 1 is capable of being parked by automatic steering at the parking position specified by the user. The parking by the automatic steering at the parking position specified by the user is hereinafter also referred to as "automatic parking".

In addition, the vehicle 1 may be capable of assisting in movement (that is, parking) to the parking position specified by the user. Hereinafter, assistance of movement to the parking position specified by the user is also referred to as "parking assistance". The parking assistance includes, for example, guiding the user of the vehicle 1 along a route from a current position of the vehicle 1 to a parking position as a parking destination. In addition, the parking assistance may include assisting in an operation of a steering wheel 46 to be described later such that the vehicle 1 does not deviate from the route from the current position of the vehicle 1 to the parking position as the parking destination.

As shown in FIG. 1, the vehicle 1 includes a sensor group 10, a navigation device a control device 30, an electric power steering system (EPS system) 40, a communication unit 50, a driving force control system 60, and a braking force control system 70. The control device 30 is an example of a moving body control device.

The sensor group 10 acquires various detection values related to the vehicle 1 or a surrounding area of the vehicle 1. The detection values acquired by the sensor group 10 are transmitted to the control device 30 and used for controlling the vehicle 1 by the control device 30. The sensor group 10 includes, for example, a front camera 11a, a rear camera 11b, a left side camera 11c, a right side camera 11d, a front sonar group 12a, a rear sonar group 12b, a left side sonar group 12c, a right side sonar group 12d, a front center radar 12e, a front left corner radar 12f, a front right corner radar 12g, a rear left corner radar 12h, a rear right corner radar 12i, and a light detection and ranging (LiDAR) 12j. The cameras 11a to 11d, the sonar groups 12a to 12d, the radars 12e to 12i, and the LiDAR 12j may function as external sensors that acquire information on an external environment including the surrounding area of the vehicle 1.

The front camera 11a, the rear camera 11b, the left side camera 11c, and the right side camera 11d output, to the control device 30, image data of surrounding images obtained by capturing images of the surrounding area of the vehicle 1. The surrounding images captured by the front camera 11a, the rear camera 11b, the left side camera 11c, and the right side camera 11d are also referred to as a front image, a rear image, a left side image, and a right side image, respectively. An image formed by the left side image and the right side image is also referred to as a side image.

The front sonar group 12a, the rear sonar group 12b, the left side sonar group 12c, and the right side sonar group 12d emit sound waves to the surrounding area of the vehicle 1 and receive reflected sounds from other objects. The front sonar group 12a includes, for example, four sonars. The sonars constituting the front sonar group 12a are respectively provided on an obliquely left front side, a front left side, a front right side, and an obliquely right front side of the vehicle 1. The rear sonar group 12b includes, for example, four sonars. The sonars constituting the rear sonar group 12b are respectively provided on an obliquely left rear side, a rear left side, a rear right side, and an obliquely right rear side of the vehicle 1. The left side sonar group 12c includes, for example, two sonars. The sonars constituting the left side sonar group 12c are provided in the front of a left side of the vehicle 1 and in the rear of the left side, respectively. The right side sonar group 12d includes, for example, two sonars. The sonars constituting the right side sonar group 12d are provided in the front of a right side of the vehicle 1 and in the rear of the right side, respectively.

The front center radar 12e, the front left corner radar 12f, the front right corner radar 12g, the rear left corner radar 12h, and the rear right corner radar 12i emit radar waves to the surrounding area of the vehicle 1 and receive radar waves reflected by other objects. More specifically, the front center radar 12e is provided at a substantial center of the front side of the vehicle 1, emits radar waves to the front side of the vehicle 1 and receives radar waves reflected by objects located on the front side of the vehicle 1. The front left corner radar 12f is provided on the obliquely left front side of the vehicle 1, emits radar waves to the obliquely left front side of the vehicle 1 and receives radar waves reflected by objects on the obliquely left front side of the vehicle 1. The front right corner radar 12g is provided on the obliquely right front side of the vehicle 1, emits radar waves to the obliquely right front side of the vehicle 1 and receives radar waves reflected by objects located on the obliquely right front side of the vehicle 1. The rear left corner radar 12h is provided on the obliquely left rear side of the vehicle 1, emits radar waves to the obliquely left rear side of the vehicle 1 and receives radar waves reflected by objects located on the obliquely left rear side of the vehicle 1. The rear right corner radar 12i is provided on the obliquely right rear side of the vehicle 1, emits radar waves to the obliquely right rear side of the vehicle 1 and receives radar waves reflected by objects located on the obliquely right rear side of the vehicle 1. The radar wave from the front center radar 12e, the front left corner radar 12f, the front right corner radar 12g, the rear left corner radar 12h, and the rear right corner radar 12i may be, for example, a millimeter wave, and is not limited thereto, and may be, for example, a microwave.

The LiDAR 12j emits a predetermined laser beam to the surrounding area of the vehicle 1, and measures a time required to detect scattered light with respect to the emitted laser beam (emitted light), thereby detecting presence or absence of an object (target) and a distance to another object. Distribution information on the object (target) detected by the LiDAR 12j is transmitted to the control device 30.

The sensor group 10 further includes wheel sensors 13a and 13b, a vehicle speed sensor 14, an inertial measurement device (IMU: inertial measurement unit) 15, and an operation detection unit 16. Each of the wheel sensors 13a and 13b detects a rotation angle of a wheel (not shown) of the vehicle 1. The wheel sensors 13a and 13b may be implemented by angle sensors or may be implemented by displacement sensors. The wheel sensors 13a and 13b output detection pulses to the control device 30 each time the wheels rotate by a predetermined angle. The detection pulses output from the wheel sensors 13a and 13b may be used to calculate the rotation angles and rotation speeds of the wheels. A movement distance of the vehicle 1 may be calculated based on the rotation angles of the wheels. The wheel sensor 13a detects, for example, a rotation angle θa of a left rear wheel. The wheel sensor 13b detects, for example, a rotation angle θb of a right rear wheel.

The vehicle speed sensor 14 detects a travel speed of the vehicle 1 (vehicle body), that is, a vehicle speed V, and outputs the detected vehicle speed V to the control device 30. The vehicle speed sensor 14 detects the vehicle speed V based on, for example, rotation of a countershaft of a transmission.

The inertial measurement device 15 detects angular velocities of the vehicle 1 in a pitch direction, a roll direction, and a yaw direction, and accelerations of the vehicle 1 in a front-rear direction, a left-right direction, and an upper-lower direction, and outputs these detection results to the control device 30. Although an example in which the inertial measurement device 15 is provided is described in the present embodiment, the present invention is not limited thereto. For example, merely an acceleration sensor that detects an acceleration of the vehicle 1 in a predetermined direction or a gyro sensor that detects an angular velocity of the vehicle 1 in a predetermined direction may be provided instead of the inertial measurement device 15.

The operation detection unit 16 detects an operation content performed by the user using an operation input unit 80 and outputs the detected operation content to the control device 30. The operation input unit 80 may include, for example, an operation button that receives an operation instructing execution of automatic parking, and an operation button that receives an operation instructing execution of parking assistance.

The navigation device 20 detects the current position of the vehicle 1 by using, for example, a global navigation satellite system (GNSS), and guides the user along a route to a destination. As an example, the navigation device 20 may guide the user along a route to the parking position specified by the user at the time of automatic parking or parking assistance. In addition, the navigation device 20 includes, for example, a storage device (not shown) provided with a map information database. The map information database includes, for example, road information indicating a road (for example, a public road) on which a vehicle (for example, the host vehicle 1) can move.

The navigation device 20 includes a touch panel 21 and a speaker 22. The touch panel 21 functions as an input device that receives input of various types of information to the control device 30 and as a display device controlled by the control device 30. That is, the user can input various commands to the control device 30 via the touch panel 21. In addition, various screens are displayed on the touch panel 21. As an example, the route to the parking position specified by the user may be guided for the user via a display screen of the touch panel 21.

The speaker 22 functions as a voice output device that notifies the user of various types of guidance information by voice. As an example, during automatic parking, voice guidance may be performed via the speaker 22. Specifically, when movement by automatic steering toward the parking position specified by the user is started, the start of the movement of the vehicle 1 may be notified by the voice guidance via the speaker 22. As another example, during parking assistance, voice guidance may be performed via the speaker 22. Specifically, the route to the parking position specified by the user may be reported (notified) to the user by voice guidance via the speaker 22.

The control device 30 is mounted on the vehicle 1, is communicably connected to other devices mounted on the vehicle 1, and integrally controls the entire vehicle 1 by communicating with the other devices. The control device 30 is implemented by, for example, an ECU including a processor that performs various types of calculation, a storage device including a non-transitory storage medium in which various types of information are stored, and an input and output device that controls input and output of data between inside and outside of the control device 30. The control device 30 may be implemented by one ECU or may be implemented by a plurality of ECUs.

Examples of the other devices connected to the control device 30 (hereinafter also simply referred to as "other devices") include constituent elements provided in the sensor group 10, an EPS ECU 45 of the EPS system 40, a driving ECU 61 of the driving force control system 60, and a braking ECU 71 of the braking force control system 70. The EPS ECU 45, the driving ECU 61, and the braking ECU 71 will be described later.

The control device 30 and the other devices are connected via, for example, a wired communication network implemented by various wire harnesses, cables, and connectors routed inside the vehicle 1. In addition, for example, a controller area network (CAN), a local interconnect network (LIN), Flex Ray, or a CAN with a flexible data rate (CAN FD) may be adopted for the communication between the control device 30 and the other devices.

The EPS system 40 includes a steering angle sensor 41, a torque sensor 42, an EPS motor 43, a resolver 44, and the EPS electronic control unit (EPS ECU) 45. The steering angle sensor 41 detects a steering angle θst of the steering 46. The torque sensor 42 detects a torque TQ applied to the steering 46.

The EPS motor 43 applies a driving force or a reaction force to a steering column 47 connected to the steering 46, thereby enabling assistance of an operation performed by the driver on the steering 46 and enabling automatic steering at the time of automatic parking. The resolver 44 detects a rotation angle θm of the EPS motor 43. The EPS ECU 45 controls the entire EPS system 40. The EPS ECU 45 includes an input and output unit, a calculation unit, and a storage unit (all not shown).

The communication unit 50 is a communication interface that communicates with an external device 90 provided outside the vehicle 1 under control of the control device 30. That is, the control device 30 can communicate with the external device 90 via the communication unit 50. For example, a mobile communication network such as a cellular line, Wi-Fi (registered trademark), or Bluetooth (registered trademark) may be adopted for the communication between the vehicle 1 and the external device 90. Examples of the external device 90 include a smartphone carried by the user, and a server managed by a manufacturer of the vehicle 1. The server may be a virtual server (cloud server) implemented by cloud computing, or may be a server implemented physically as one device.

The driving force control system 60 includes the driving ECU 61. The driving force control system 60 executes driving force control of the vehicle 1. The driving ECU 61 controls a driving force of the vehicle 1 by controlling an engine or the like (not shown) based on an operation performed on an accelerator pedal (not shown) by the user or an instruction from the control device 30.

The braking force control system 70 includes the braking ECU 71. The braking force control system 70 executes braking force control of the vehicle 1. The braking ECU 71 controls a braking force of the vehicle 1 by controlling a brake mechanism or the like (not shown) based on an operation performed on a brake pedal (not shown) by the user.

(Control Device)

Next, an example of the control device 30 will be described in detail. The control device 30 includes an input and output unit 31, a calculation unit 32, and a storage unit 33. The input and output unit 31 is an interface that inputs and outputs data between inside and outside of the control device 30 under control of the calculation unit 32.

The storage unit 33 includes a non-volatile storage medium, such as a flash memory accessible by the calculation unit 32, and stores various types of information (for example, data and programs) for controlling an operation of the vehicle 1. In addition, the storage unit 33 stores, for example, information indicating the parking position specified by the user. Further, the storage unit 33 may store passage information to be described later.

In the present embodiment, as will be described later, the control device 30 (the calculation unit 32) appropriately stores the passage information in the storage unit 33. However, the present invention is not limited thereto. For example, the passage information may be prepared by an administrator of a parking lot in which the vehicle 1 is routinely parked, and may be appropriately distributed to the control device 30 via a predetermined network. In addition, the passage information may be stored in a server accessible by the control device 30 (for example, a server of the administrator of the parking lot in which the vehicle 1 is routinely parked) instead of the storage unit 33. In this case, the control device 30 (the calculation unit 32) may appropriately refer to the passage information stored in the server. In addition, the passage information may be provided in the map information database of the navigation device 20 as a part of the road information, for example.

The calculation unit 32 is implemented by, for example, a processor that performs various types of calculation, such as a central processing unit (CPU), and controls constituent elements of the vehicle 1 by executing programs stored in the storage unit 33. Accordingly, the automatic parking or parking assistance is implemented. As an example, when an operation instructing execution of the automatic parking is received via the input and output unit 31, the calculation unit 32 executes the automatic parking. As another example, when an operation instructing execution of the parking assistance is received via the input and output unit 31, the calculation unit 32 executes the parking assistance.

In addition, the calculation unit 32 includes an external environment recognition unit 32a, a detection unit 32b, a search unit 32c, and a control unit 32d.

The external environment recognition unit 32a acquires recognition data of an external environment including the surrounding area of the host vehicle 1. The recognition data of the external environment includes, for example, image data of the surrounding images captured by the cameras 11a to 11d. More specifically, the recognition data of the external environment may be, for example, data including information indicating an image of an object (for example, another vehicle or a passage boundary) in the surrounding area of the vehicle 1, a distance between the vehicle 1 and the object, and a relative position between the vehicle 1 and the object obtained by integrally processing information obtained by two or more types of external sensors among the cameras 11a to 11d, the sonar groups 12a to 12d, the radars 12e to 12i, and the LiDAR 12j (so-called sensor fusion).

The detection unit 32b detects another vehicle in the surrounding area of the host vehicle 1 based on the recognition data of the external environment acquired by the external environment recognition unit 32a. More specifically, the detection unit 32b detects another vehicle (hereinafter also referred to as "following vehicle") following the host vehicle 1. The following vehicle is, for example, a vehicle with the host vehicle 1 located in a traveling direction thereof (for example, on a front side thereof) and a distance to the host vehicle 1 is equal to or less than a predetermined distance (for example, 20 [m]). In addition, the following vehicle may be a vehicle that moves along a passage forming at least a part of the route of the host vehicle 1, and moves along the passage later than the host vehicle 1 in time series (for example, moves along the passage immediately after the host vehicle 1 moves).

In addition, in the present embodiment, the detection unit 32b also detects a passage in the surrounding area of the host vehicle 1 based on the recognition data of the external environment. Here, the passage is, for example, an area partitioned by a predetermined passage boundary and in which a vehicle (for example, the host vehicle 1) can move. As an example, the detection unit 32b performs image analysis on the surrounding image captured by the cameras 11a to 11d so as to detect a predetermined geographical object such as a partition line (for example, a white line or a yellow line) or a fence as the passage boundary, and detects an area partitioned by such a passage boundary as the passage.

Then, the control unit 32d stores, in the storage unit 33, information indicating the passage detected by the detection unit 32b as the passage information. The passage information stored in the storage unit 33 in this manner is used for a route search performed by the search unit 32c to be described later. In this way, in the present embodiment, the control device 30 may learn (in other words, accumulate) the passage information based on the recognition data of the external environment. Accordingly, for example, even when passage information indicating a passage in a parking lot (for example, a parking lot P to be described later) in which the host vehicle 1 is routinely parked is not provided in the map information database of the navigation device 20, the control device 30 may perform automatic parking or parking assistance to a predetermined parking position in the parking lot.

The search unit 32c searches for a route from the current position to a predetermined parking position based on the current position of the host vehicle 1 and the passage information stored in the storage unit 33. For example, at the time of automatic parking or parking assistance, first, the search unit 32c searches for a route along which a distance (movement distance) to be moved to reach the parking position specified by the user is the shortest as a normally-used route (hereinafter, also referred to as "normal route"). The normal route is an example of a first route. The normal route is not limited to the route having the shortest movement distance, and may also be a route satisfying a predetermined condition specified by the user (for example, a route passing a predetermined point).

At the time of automatic parking, the control unit 32d performs control to move the host vehicle 1 to the parking position along the route found by the search unit 32c. As an example, the control unit 32d moves the host vehicle 1 to the parking position along the normal route found by the search unit 32c. In addition, at the time of parking assistance, the control unit 32d performs control to assist in moving the host vehicle 1 to the parking position along the route found by the search unit 32c. As an example, the control unit 32d performs control to assist in moving the host vehicle 1 to the parking position along the normal route found by the search unit 32c.

In addition, when the detection unit 32b detects a following vehicle while the host vehicle 1 is moving to the parking position along the normal route, the search unit 32c searches for another route different from the normal route based on the current position of the host vehicle 1 and the passage information stored in the storage unit 33. The other route is an example of a second route. In the present embodiment, as the other route (that is, the second route), a route (hereinafter also referred to as "circulation route") along which the host vehicle 1 moves to the parking position after circulating in a surrounding area of the parking position is searched for. Accordingly, it is possible to search for a route whose destination is the same parking position as that of the normal route as the circulation route. In addition, by setting the circulation route to a route circulating in the surrounding area of the parking position as the destination, it is possible to prevent the host vehicle 1 from being greatly separated from the parking position due to the movement along the circulation route. Therefore, it is possible to control the host vehicle 1 in consideration of the following vehicle while minimizing an increase in the movement distance of the host vehicle 1 due to the movement along the circulation route.

At the time of automatic parking, when the circulation route is found by the search unit 32c, the control unit 32d performs control to move the host vehicle 1 to the parking position along the found circulation route. As an example, the control unit 32d moves the host vehicle 1 to the parking position along the circulation route found by the search unit 32c. That is, in this case, the control unit 32d moves the host vehicle 1 to the parking position after circulating the host vehicle 1 in the surrounding area of the parking position.

In addition, at the time of parking assistance, when the circulation route is found by the search unit 32c, the control unit 32d performs control to assist in moving the host vehicle 1 to the parking position along the found circulation route. As an example, the control unit 32d assists in moving the host vehicle 1 to the parking position along the circulation route found by the search unit 32c. That is, in this case, the control unit 32d assists in moving the host vehicle 1 to the parking position after circulating the host vehicle 1 in the surrounding area of the parking position.

As described above, in the present embodiment, the control device 30 learns (in other words, accumulates) the passage information based on the recognition data of the external environment. Therefore, for example, in a parking lot in which the host vehicle 1 does not travel sufficiently, the passage information may not be sufficiently accumulated, and it may not be possible to find the circulation route.

Here, in the present embodiment, in a case where no circulation route is found as a result of the search for the circulation route performed by the search unit 32c, the control unit 32d executes control (hereinafter, also referred to as "notification control") to perform a notification so as to prompt the user of the host vehicle 1 to collect the passage information. A specific example of the notification by the notification control will be described later, thus description thereof is omitted here.

In addition, in the case where no circulation route is found as a result of the search for the circulation route performed by the search unit 32c, the control unit 32d stops, at that time, automatic parking or parking assistance executed until then, for example. Accordingly, in the case where no circulation route is found, it is possible to switch to complete manual driving by the user and prompt the user to take an appropriate action.

Hereinafter, an operation example of the host vehicle 1 related to automatic parking will be described. An operation example of the host vehicle 1 related to parking assistance is substantially the same as the operation example of the host vehicle 1 related to automatic parking described here. That is, an operation of the host vehicle 1 related to parking assistance is different from an operation of the host vehicle 1 related to automatic parking only in that, instead of moving the host vehicle 1 to the parking position by automatic steering, the movement is performed by manual driving by the user, and control for assisting the movement is performed by the control device 30. Therefore, description of a detailed operation example of the host vehicle 1 related to parking assistance will be omitted.

(Operation Related to Automatic Parking)

FIG. 2 shows an operation example of the host vehicle 1 in the parking lot P at the time of automatic parking. For example, the parking lot P shown in FIG. 2 includes a plurality of parking positions (parking spaces) and is a parking lot in which a vehicle parked at each parking position is decided in advance. Examples of the parking lot P of this type include a so-called "monthly parking lot" and a parking lot for a resident of a housing complex such as a condominium or an apartment. In addition, the parking lot P includes three passages C1 to C3 extending in a vertical direction in FIG. 2 and three passages L1 to L3 extending in a horizontal direction in FIG. 2.

In FIG. 2, a normal route (hereinafter, also referred to as "normal route α") along which the host vehicle 1 travels when the host vehicle 1 is to be automatically parked at a parking position PS that is a parking position of the host vehicle 1 is indicated by an arrow α. For example, upon receiving an operation instructing execution of automatic parking, the control device 30 searches for the normal route α and moves the host vehicle 1 to the parking position PS along the found normal route α.

Figure 3:
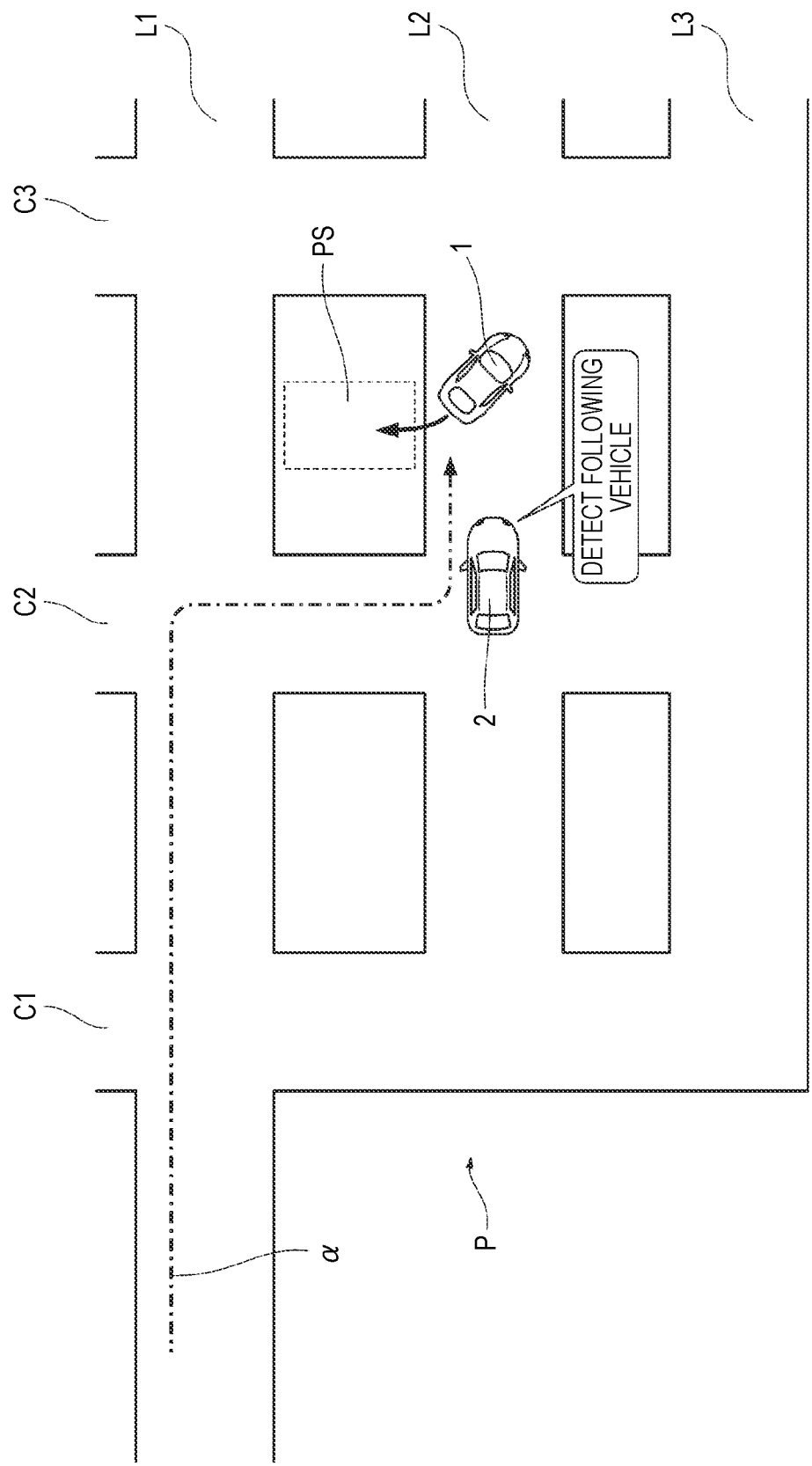
FIG. 3 shows a situation in which a following vehicle 2 is detected when the host vehicle 1 is moving to the parking position PS along the normal route α.

FIG. 3 shows a situation in which a following vehicle 2 appears when the host vehicle 1 is moving to the parking position along the normal route. More specifically, in the example shown in FIG. 3, the following vehicle 2 appears when the host vehicle 1 arrives in front of the parking position PS and is about to enter backward toward the parking position PS. In such a case, the control device 30 detects the following vehicle 2.

Figure 4:
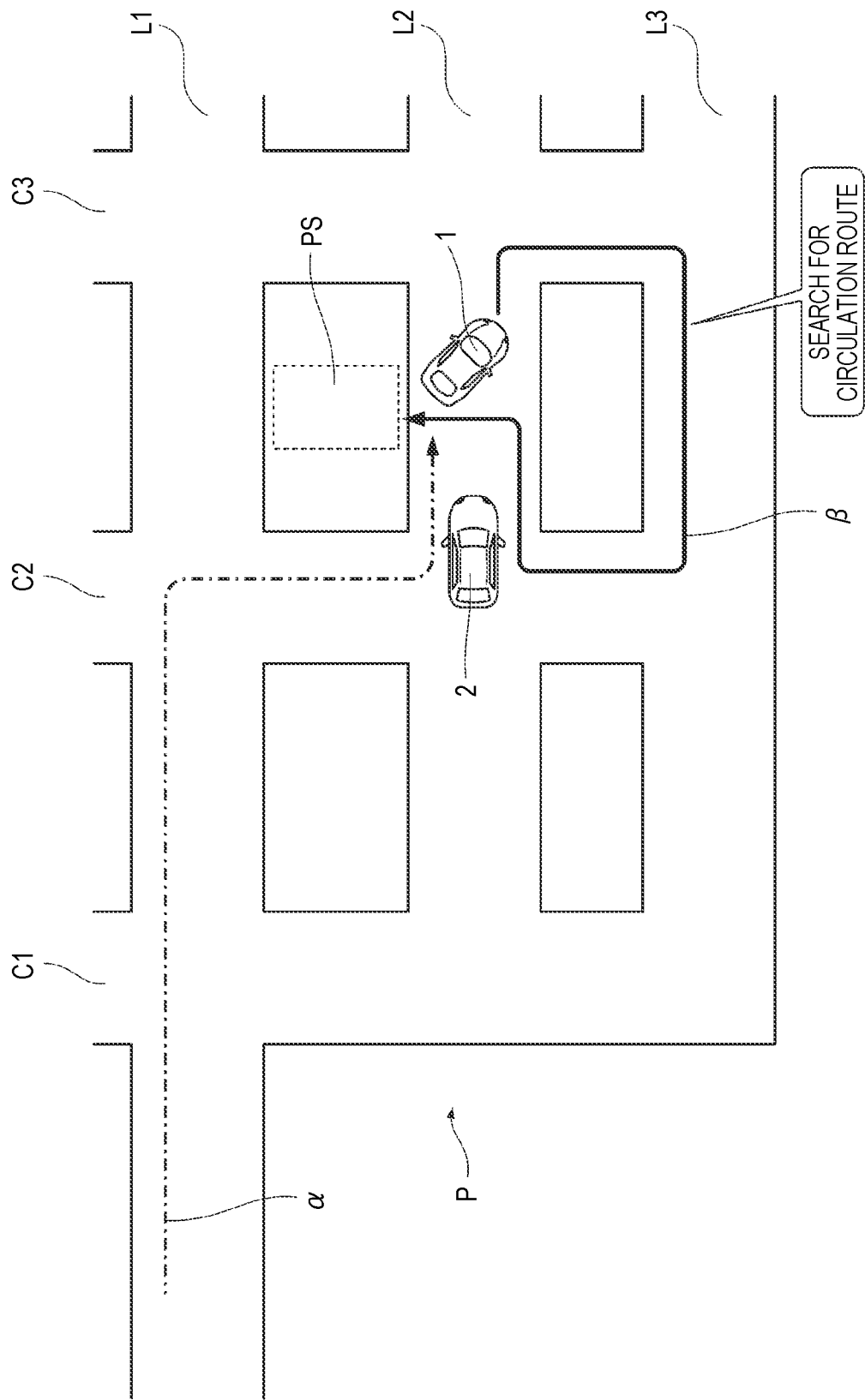
FIG. 4 shows a situation in which the host vehicle 1 searches for a circulation route β.

FIG. 4 shows a situation subsequent to that in FIG. 3. Upon detecting the following vehicle 2, the control device 30 searches for the circulation route. In the example described here, it is assumed that a circulation route indicated by an arrow β in FIG. 4 (hereinafter also referred to as "circulation route β") is found as a result of the search. As exemplified by the circulation route β, for example, the circulation route is desirably a route that does not include backward movement except for movement when entering the parking position PS. That is, the circulation route is desirably a route that allows only forward movement except for movement when entering the parking position PS.

In general, a vehicle such as the host vehicle 1 is provided with a larger number of sensors that detect the front of the vehicle than sensors that detect the rear of the vehicle. Therefore, detection performance of detecting an object such as an obstacle tends to be higher in the front of the vehicle than in the rear of the vehicle. In this case, since backward movement is reduced as much as possible along the circulation route, the host vehicle 1 may move more safely along the circulation route.

Figure 5:
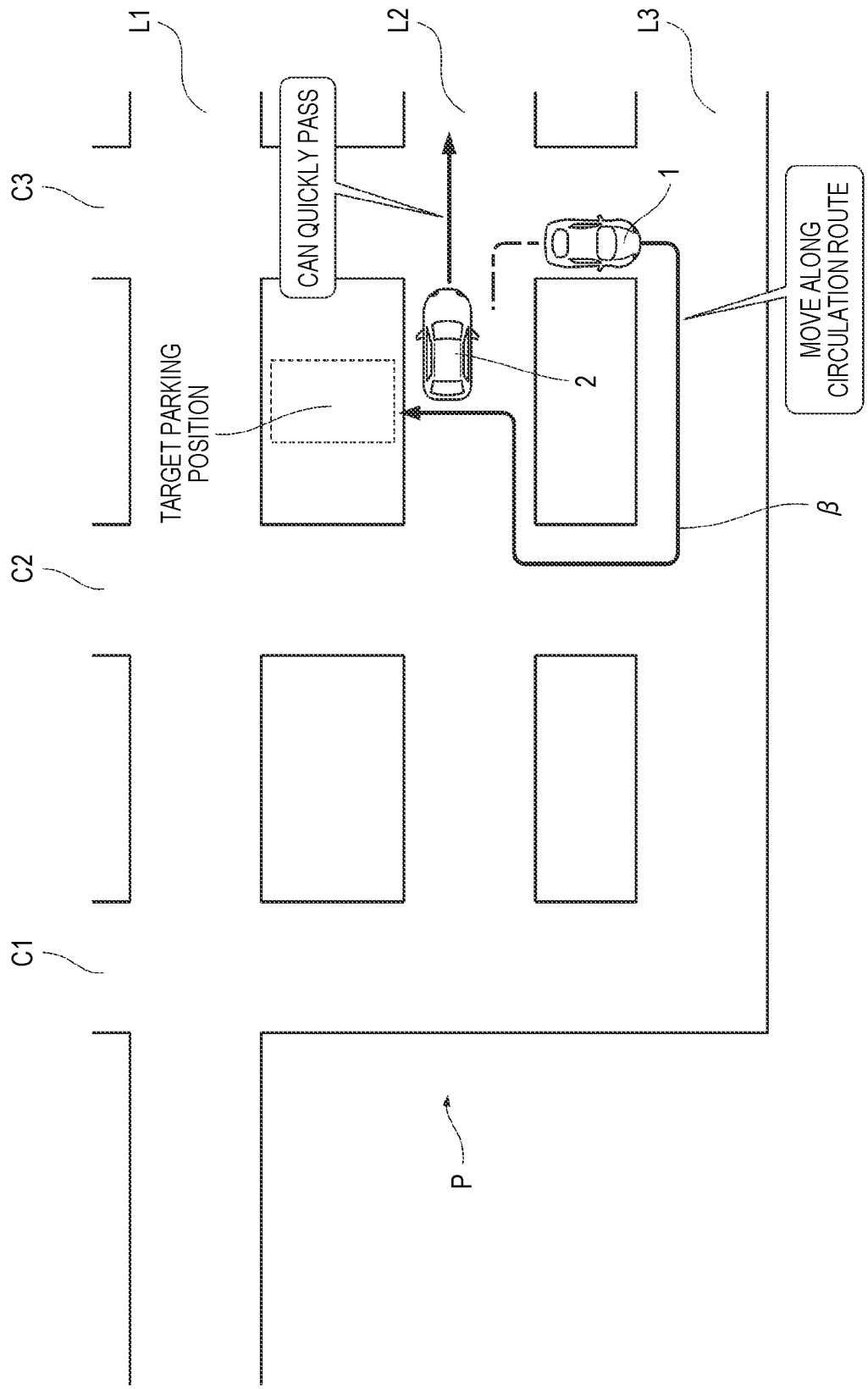
FIG. 5 shows a situation in which the host vehicle 1 moves along the circulation route (3.

FIG. 5 shows a situation subsequent to that in FIG. 4. When the circulation route β is found, the control device 30 moves the host vehicle 1 along the circulation route β. Accordingly, the host vehicle 1 moves to the parking position PS after circulating in the surrounding area of the parking position PS. The following vehicle 2 may quickly pass in front of the parking position PS while the host vehicle 1 is moving along the circulation route β.

Figure 6:
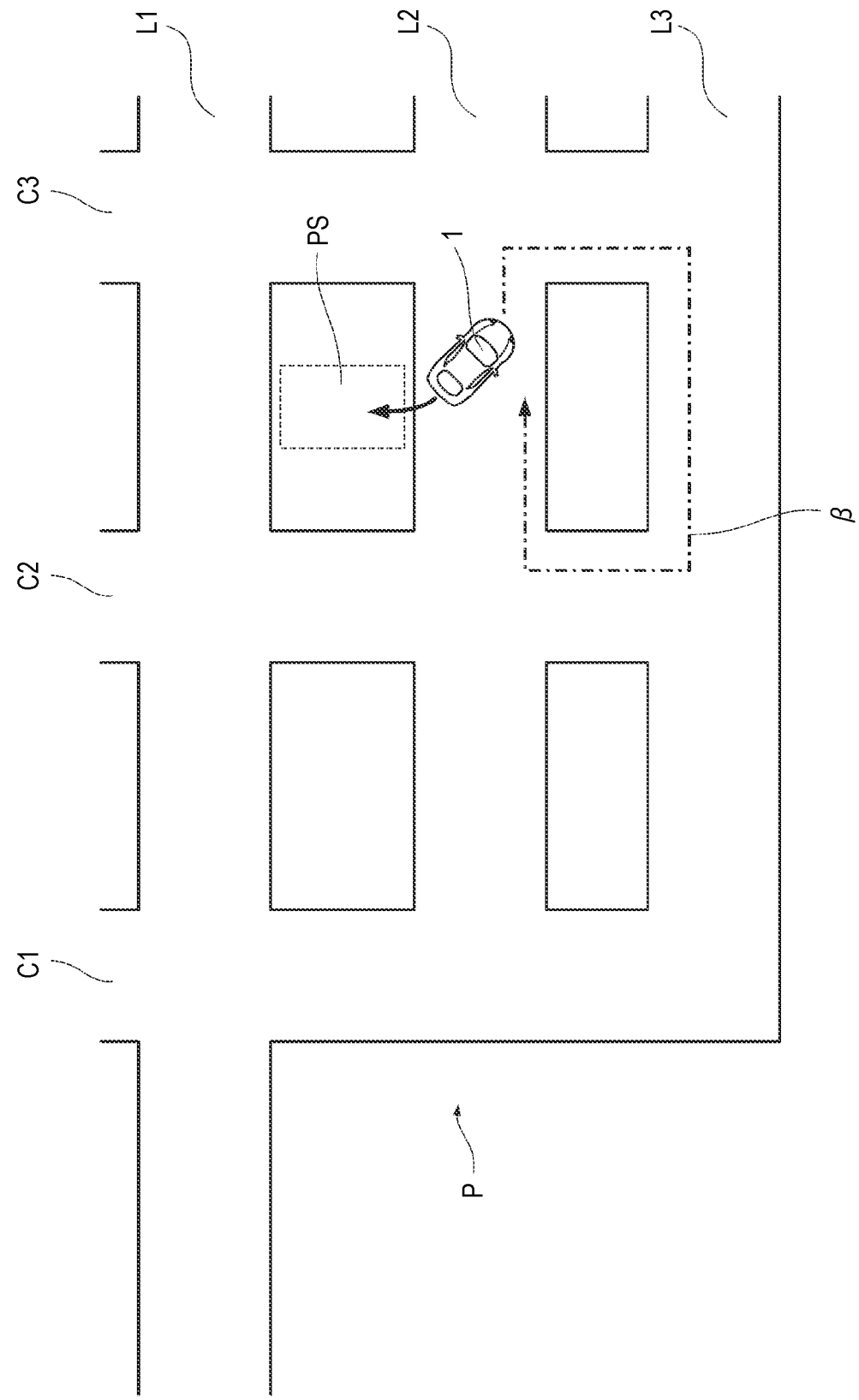
FIG. 6 shows a situation in which the host vehicle 1 moves along the circulation route β and starts entering the parking position PS.

FIG. 6 shows a situation subsequent to that in FIG. 5. The control device 30 moves the host vehicle 1 to the front of the parking position PS along the circulation route β, and then, for example, moves the host vehicle 1 backward toward the parking position PS to enter the parking position PS and park the host vehicle 1 at the parking position PS. Accordingly, the parking of the host vehicle 1 to the parking position PS is completed.

As described above, when the following vehicle 2 is detected while the host vehicle 1 is moving to the parking position PS along the normal route α, the control device 30 searches for the circulation route. When the circulation route β is found as a result of the search for the circulation route, the control device 30 moves the host vehicle 1 to the parking position PS along the found circulation route β. Accordingly, when the following vehicle 2 is present, the route along which the host vehicle 1 moves may be changed from the normal route α overlapping a route of the following vehicle 2 to the circulation route β, and movement control of the host vehicle 1 may be performed in consideration of the following vehicle 2.

In addition, even when the following vehicle 2 is detected, when the circulation route such as the circulation route β is found, the control device 30 moves the host vehicle 1 along the found circulation route and continues automatic parking to the parking position PS. Accordingly, an opportunity to be parked at the parking position PS by automatic parking is increased, and thus convenience is improved for the user of the host vehicle 1.

In addition, as described above, in the case where no circulation route is found as a result of the search for the circulation route performed by the search unit 32c, the control device 30 performs the notification control so as to perform a notification to prompt the user of the host vehicle 1 to collect the passage information.

Figure 7:
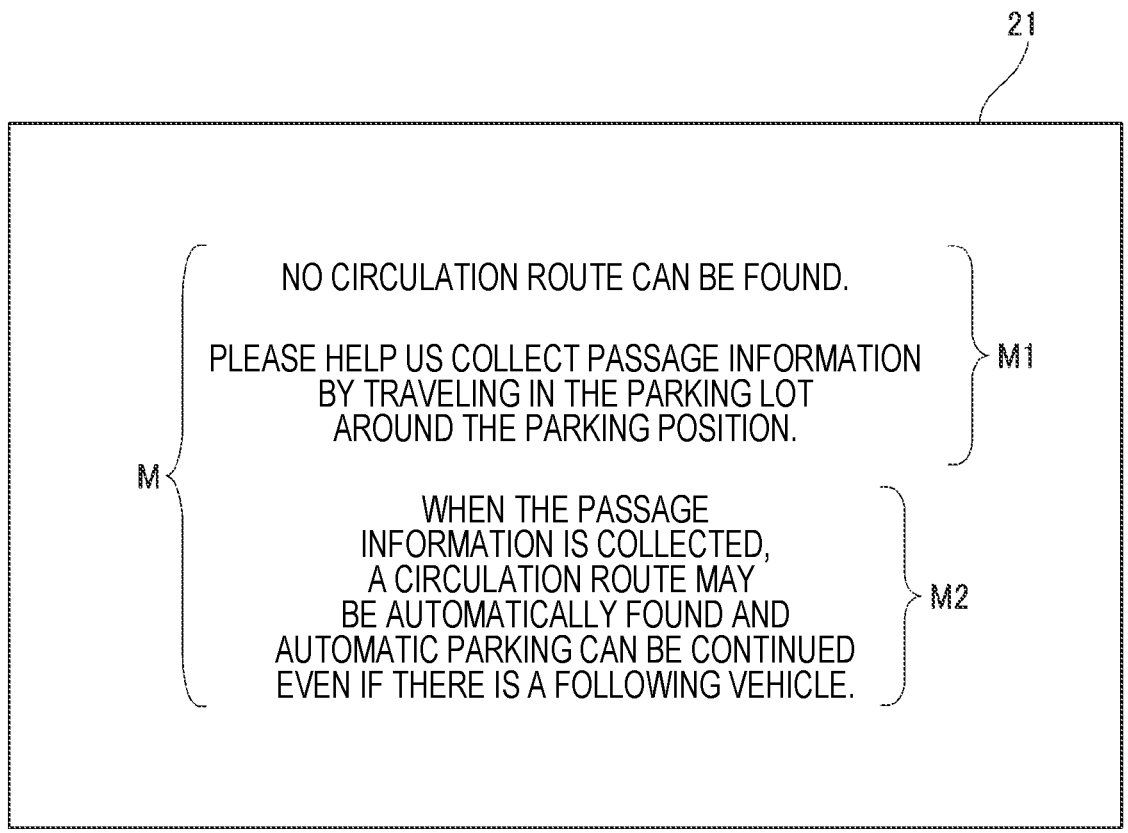
FIG. 7 shows a display example of a touch panel 21 when a notification is performed by notification control.

FIG. 7 shows a display example of the touch panel 21 when the notification is performed by the notification control. Specifically, in the example shown in FIG. 7, as the notification prompting the collection of the passage information, a message M "No circulation route can be found. Please help us collect passage information by traveling in the parking lot around the parking position. When the passage information is collected, a circulation route may be automatically found and automatic parking can be continued even if there is a following vehicle." is displayed on the touch panel 21.

In this way, when no circulation route is found as a result of the search for the circulation route performed by the search unit 32c, the control device 30 performs a notification to prompt the user of the host vehicle 1 to collect the passage information so as to prompt an increase in (in other words, accumulation of) the passage information stored in the storage unit 33, and thus may increase a possibility that a circulation route can be found based on the passage information stored in the storage unit 33 thereafter.

In addition, the notification prompting the collection of the passage information includes a notification prompting movement in the surrounding area of the parking position PS such as a message M1 "No circulation route can be found. Please help us collect passage information by traveling in the parking lot around the parking position." Therefore, it is possible to assist in efficient collection of the passage information necessary for searching for the circulation route. That is, the host vehicle 1 moves along a passage that is likely to be the circulation route or is likely to be related to the circulation route by manual driving of the user who is prompted by the notification, and the collection of the passage information is performed, so that the passage information necessary for searching for the circulation route may be efficiently collected by utilizing subjectivity (experience) of the user.

In addition, the notification prompting the collection of the passage information includes a notification indicating a benefit of collecting the passage information such as a message M2 "When the passage information is collected, a circulation route may be automatically found and automatic parking can be continued even if there is a following vehicle." Therefore, it is possible to increase a motivation of the user to collect the passage information and further prompt the collection of the passage information.

(Processing Executed by Control Device)

Next, an example of processing executed by the control device 30 will be described with reference to FIGS. 8 to 10. For example, when it is detected that the host vehicle 1 enters a predetermined parking lot such as the parking lot P described above, the control device 30 executes a series of processing shown in FIG. 8.

Figure 8:
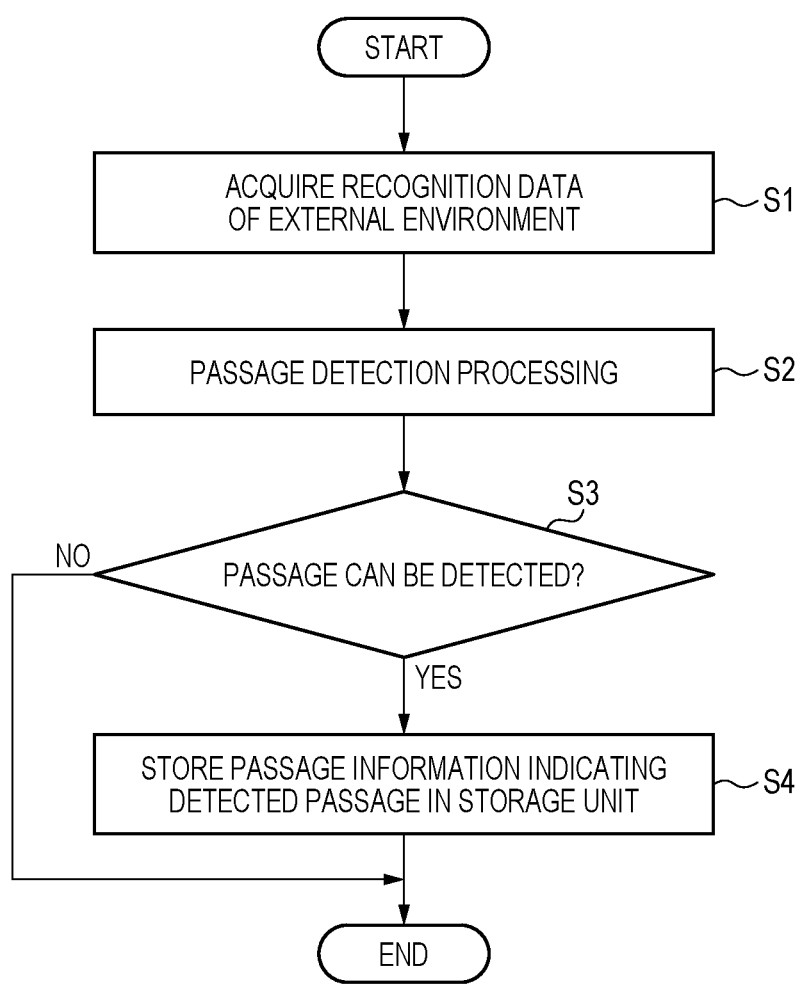
FIG. 8 is a flow chart showing an example of processing executed by a control device 30 in relation to collection of passage information.

As shown in FIG. 8, first, the control device 30 acquires the recognition data of the external environment including the surrounding area of the host vehicle 1 (step S1). Next, the control device 30 executes passage detection processing (step S2). The passage detection processing is, for example, processing of detecting a predetermined passage boundary based on the recognition data of the external environment acquired in step S1 and detecting an area partitioned by the passage boundary as a passage.

Next, the control device 30 determines whether the passage can be detected (step S3). When it is determined that the passage can be detected (step S3: Yes), the control device stores passage information indicating the detected passage in the storage unit 33 (step S4), and ends the series of processing shown in FIG. 8. On the other hand, when it is determined that no passage can be detected (step S3: No), the control device 30 ends the series of processing shown in FIG. 8.

Figure 9:
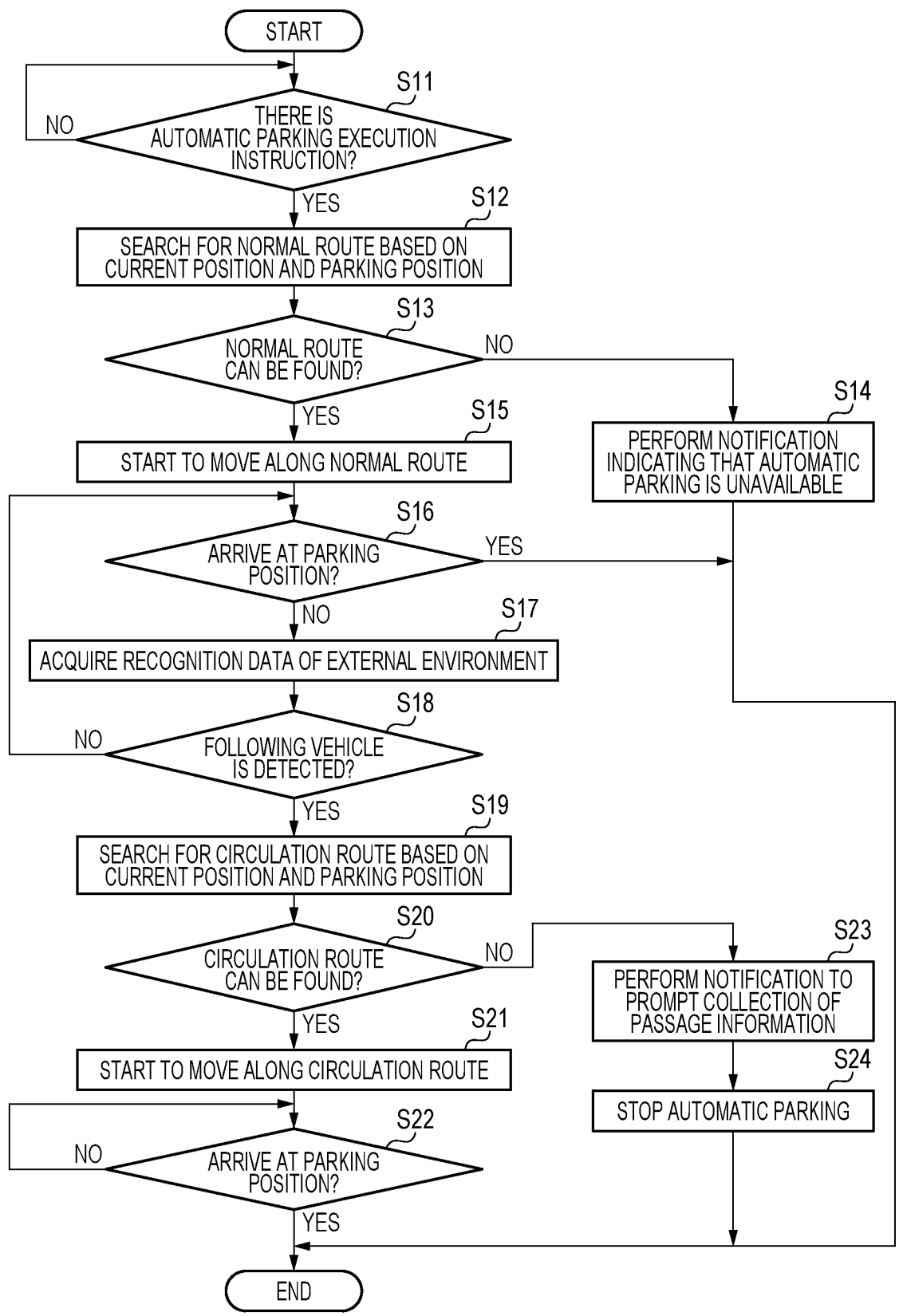
FIG. 9 is a flow chart showing an example of processing executed by the control device 30 in relation to automatic parking.

In addition, the control device 30 executes a series of processing shown in FIG. 9 in relation to automatic parking. For example, the control device 30 executes the series of processing shown in FIG. 9 when activated.

As shown in FIG. 9, first, the control device 30 waits until there is an automatic parking execution instruction (for example, an operation instructing execution of automatic parking) (step S11: No loop), and when it is determined that there is an automatic parking execution instruction (step S11: Yes), the control device 30 searches for the normal route based on the current position of the host vehicle 1 and the parking position (for example, the parking position PS described above) as the parking destination (step S12).

Next, the control device 30 determines whether the normal route can be found (step S13). As a result, when it is determined that no normal route can be found (step S13: No), the control device 30 performs a notification indicating that automatic parking is unavailable (step S14). This notification is implemented by displaying a message such as "automatic parking cannot be performed." on the touch panel 21.

On the other hand, when it is determined that the normal route can be found (step S13: Yes), the control device 30 starts to move the host vehicle 1 along the found normal route (step S15). Then, the control device 30 determines whether the host vehicle 1 arrives at the parking position as the parking destination (step S16). When it is determined that the host vehicle 1 arrives at the parking position (step S16: Yes), the control device 30 ends the series of processing shown in FIG. 9.

On the other hand, when it is determined that the host vehicle 1 does not arrive at the parking position (step S16: No), the control device 30 acquires the recognition data of the external environment (step S17). Then, the control device 30 determines whether a following vehicle is detected based on the acquired recognition data of the external environment (step S18).

When it is determined that no following vehicle is detected (step S18: No), the control device 30 returns to the processing in step S16. On the other hand, when it is determined that the following vehicle is detected (step S18: Yes), the control device 30 searches for the circulation route based on the current position of the host vehicle 1 and the parking position as the parking destination (step S19).

Next, the control device 30 determines whether the circulation route can be found (step S20). As a result, when it is determined that the circulation route can be found (step S20: Yes), the control device 30 starts to move the host vehicle 1 along the found circulation route (step S21). Then, the control device 30 waits for the host vehicle 1 to arrive at the parking position as the parking destination (step S22: No loop), and when it is determined that the host vehicle 1 arrives at the parking position (step S22: Yes), the series of processing shown in FIG. 9 is ended.

On the other hand, when it is determined that no circulation route can be found (step S20: No), the control device 30 performs a notification to prompt collection of passage information by notification control (step S23). Then, the control device 30 stops automatic parking (here, movement of the host vehicle 1 along the found normal route) (stepS 24), switches to manual driving, and ends the series of processing shown in FIG. 9.

As described above, when the following vehicle is detected while the host vehicle 1 is moving to the predetermined parking position along the normal route, the control device 30 searches for the circulation route. When the circulation route is found as a result of the search for the circulation route, the control device 30 moves the host vehicle 1 to the predetermined parking position along the found circulation route. Accordingly, when the following vehicle is present, the route along which the host vehicle 1 moves is changed from the normal route overlapping a route of the following vehicle to the circulation route, and movement control of the host vehicle 1 may be performed in consideration of the following vehicle.

Figure 10:
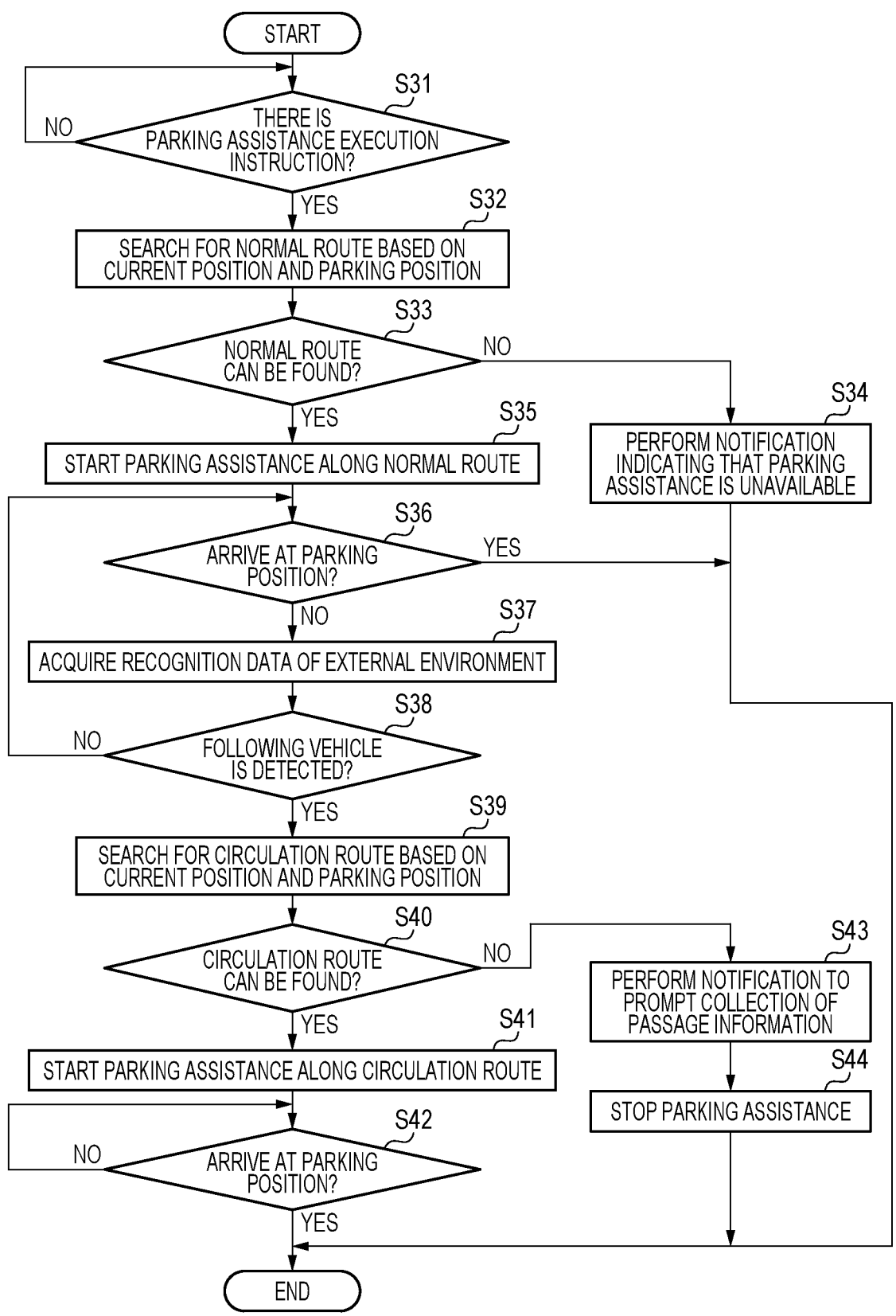
FIG. 10 is a flow chart showing an example of processing executed by the control device 30 in relation to parking assistance.

In addition, the control device 30 executes a series of processing shown in FIG. 10 in relation to parking assistance. For example, the control device 30 executes the series of processing shown in FIG. 10 when activated.

As shown in FIG. 10, first, the control device 30 waits until there is a parking assistance execution instruction (for example, an operation instructing execution of parking assistance) (step S31: No loop), and when it is determined that there is a parking assistance execution instruction (step S31: Yes), the control device 30 searches for the normal route based on the current position of the host vehicle 1 and the parking position (for example, the parking position PS described above) as the parking destination (step S32).

Next, the control device 30 determines whether the normal route can be found (step S33). As a result, when it is determined that no normal route can be found (step S33: No), the control device 30 performs a notification indicating that parking assistance is unavailable (step S34). This notification is implemented by displaying a message such as "parking assistance cannot be performed." on the touch panel 21.

On the other hand, when it is determined that the normal route can be found (step S33: Yes), the control device 30 starts to assist in moving the host vehicle 1 along the found normal route (step S35). Then, the control device 30 determines whether the host vehicle 1 arrives at the parking position as the parking destination (step S36). When it is determined that the host vehicle 1 arrives at the parking position (step S36: Yes), the control device 30 ends the series of processing shown in FIG. 10.

On the other hand, when it is determined that the host vehicle 1 does not arrive at the parking position (step S36: No), the control device 30 acquires the recognition data of the external environment (step S37). Then, the control device 30 determines whether a following vehicle is detected based on the acquired recognition data of the external environment (step S38).

When it is determined that no following vehicle is detected (step S38: No), the control device 30 returns to the processing in step S36. On the other hand, when it is determined that the following vehicle is detected (step S38: Yes), the control device 30 searches for the circulation route based on the current position of the host vehicle 1 and the parking position as the parking destination (step S39).

Next, the control device 30 determines whether the circulation route can be found (step S40). As a result, when it is determined that the circulation route can be found (step S40: Yes), the control device 30 starts to assist in moving the host vehicle 1 along the found circulation route (step S41). Then, the control device 30 waits for the host vehicle 1 to arrive at the parking position as the parking destination (step S42: No loop), and when it is determined that the host vehicle 1 arrives at the parking position (step S42: Yes), the series of processing shown in FIG. 10 is ended.

On the other hand, when it is determined that no circulation route can be found (step S40: No), the control device 30 performs a notification to prompt collection of passage information by notification control (step S43). Then, the control device 30 stops the parking assistance (here, the assistance of the movement of the host vehicle 1 along the found normal route) (step S44), switches to complete manual driving by the user, and ends the series of processing shown in FIG. 10.

As described above, when the following vehicle is detected while the host vehicle 1 is moving to the predetermined parking position along the normal route, the control device 30 searches for the circulation route. When the circulation route is found as a result of the search for the circulation route, the control device 30 assists in moving the host vehicle 1 to the predetermined parking position along the found circulation route. Accordingly, when the following vehicle is present, the route along which the host vehicle 1 moves is prompted to be changed from the normal route overlapping a route of the following vehicle to the circulation route, and control of the host vehicle 1 may be performed in consideration of the following vehicle.

A control method of the control device 30 described in the above embodiment can be implemented by executing a program prepared in advance by a computer (processor). The program is stored in a computer-readable storage medium and executed by being read from the storage medium. In addition, the program may be provided in a form stored in a non-transitory storage medium such as a flash memory, or may be provided via a network such as the Internet. In addition, the computer that executes the program may be, for example, a computer provided in the control device 30 (for example, a CPU provided in the control device 30), and is not limited thereto, and may also be provided in another device (for example, a server) capable of communicating with the control device 30.

Although the embodiment of the present invention is described above with reference to the accompanying drawings, it is needless to say that the present invention is not limited to such an embodiment. It is apparent that those skilled in the art can conceive of various modifications and alterations within the scope described in the claims, and it is understood that such modifications and alterations naturally fall within the technical scope of the present invention. In addition, the respective constituent elements in the above embodiment may be combined as desired without departing from the gist of the invention.

For example, in the above embodiment, the notification to prompt the user of the host vehicle 1 to collect the passage information is performed by a display by the touch panel 21. However, instead of or in addition to the display by the touch panel 21, a voice output of a predetermined content from the speaker 22 may also be employed to notify the user of the host vehicle 1.

In addition, in the above embodiment, the search unit 32*c* searches for the normal route and the circulation route by using the passage information stored in the storage unit 33, but the present invention is not limited thereto. For example, when the map information database of the navigation device 20 includes passage information indicating a passage in a parking lot where the host vehicle 1 is parked, the search unit 32*c* may search for the normal route and the circulation route by using the passage information.

In addition, in the above embodiment, an example in which the moving body control device according to the present invention is implemented by the control device 30 provided in the vehicle 1 is described, but the present invention is not limited thereto. For example, a part or all of functional units of the control device 30 described above may be implemented by a server capable of communicating with the control device 30. That is, the moving body control device according to the present invention may be implemented by a server device capable of communicating with the control device 30 provided in the vehicle 1. In addition, the server may be a virtual server (cloud server) implemented in cloud computing, or may be a physical server implemented as one device.

In addition, in the above embodiment, an example is described in which the moving body in the present invention is the vehicle 1 that is a four-wheeled automobile, but the present invention is not limited thereto. The moving body in the present invention may also be a two-wheeled automobile (so-called motorcycle), a ship or an aircraft.

In the present specification, at least the following matters are described. Although corresponding constituent elements and the like in the above embodiment are shown in parentheses, the present invention is not limited thereto.

(1) A moving body control device (control device 30) configured to control a moving body (host vehicle 1), including:
- an external environment recognition unit (external environment recognition unit 32a) configured to acquire recognition data of an external environment including a surrounding area of the moving body;
- a detection unit (detection unit 32b) configured to detect, based on the recognition data of the external environment, a following moving body (following vehicle 2) that follows the moving body;
- a search unit (search unit 32c) configured to search, based on a current position of the moving body and passage information indicating a passage through which the moving body is movable, for a route from the current position to a predetermined parking position (parking position PS); and
- a control unit (control unit 32d) configured to move the moving body to the parking position along the found route, in which
- when the following moving body is detected while the moving body is moving to the parking position along a first route (normal route α), the search unit searches for a second route different from the first route, and,
- when the second route is found, the control unit moves the moving body to the parking position along the second route (circulation route β).

According to (1), when the following moving body is detected while the moving body is moving to the parking position along the first route, it is possible to search for the second route different from the first route and move the moving body to the parking position along the second route. Accordingly, when there is a following moving body, the route along which the moving body moves may be changed from the first route that may overlap a route of the following moving body to the second route, and movement control of the moving body may be performed in consideration of the following moving body. In addition, even when the following moving body is detected, it is possible to continue the movement of the moving body to the parking position, and thus it is possible to improve convenience for a user of the moving body.

(2) A moving body control device configured to control a moving body, including:
- an external environment recognition unit configured to acquire recognition data of an external environment including a surrounding area of the moving body;
- a detection unit configured to detect, based on the recognition data of the external environment, a following moving body that follows the moving body;
- a search unit configured to search, based on a current position of the moving body and passage information indicating a passage through which the moving body is movable, for a route from the current position to a predetermined parking position; and
- a control unit configured to assist in moving the moving body to the parking position along the found route, in which
- when the following moving body is detected while the moving body is moving to the parking position along a first route, the search unit searches for a second route different from the first route, and,
- when the second route is found, the control unit assists in moving the moving body to the parking position along the second route.

According to (2), when the following moving body is detected while the moving body is moving to the parking position along the first route, it is possible to search for the second route different from the first route and assist in moving the moving body to the parking position along the second route. Accordingly, when there is a following moving body, the route along which the moving body moves may be changed from the first route that may overlap a route of the following moving body to the second route, and movement assistance of the moving body may be performed in consideration of the following moving body. In addition, even when the following moving body is detected, it is possible to continue the movement assistance of the moving body to the parking position, and thus it is possible to improve convenience for a user of the moving body.

(3) The moving body control device according to (1) or (2), in which
- the second route is a route along which movement to the parking position is performed after circulation in a surrounding area of the parking position.

According to (3), since the second route is a route along which movement to the parking position is performed after circulation in the surrounding area of the parking position, it is possible to control the moving body in consideration of the following moving body while minimizing an increase in a movement distance of the moving body.

(4) The moving body control device according to (3), in which
- the control unit further stores, in a storage unit, information indicating a passage detected based on the recognition data of the external environment as the passage information,
- the search unit searches for the route based on the passage information stored in the storage unit, and
- when no second route is found as a result of the search for the second route, the control unit further performs a notification to prompt a user of the moving body to collect the passage information.

According to (4), when no second route is found as a result of the search for the second route, it is possible to perform a notification to prompt the user of the moving body to collect the passage information. Accordingly, it is possible to prompt an increase in the passage information stored in the storage unit and increase a possibility that the second route is found based on the passage information stored in the storage unit thereafter.

(5) The moving body control device according to (4), in which
- the notification includes a notification prompting movement in the surrounding area of the parking position.

According to (5), since the notification prompting collection of the passage information includes the notification prompting the movement in the surrounding area of the parking position, it is possible to assist in efficient collection of passage information necessary for searching for the second route.

(6) The moving body control device according to (4), in which,
- the notification includes a notification indicating a benefit of collecting the passage information.

According to (6), since the notification prompting collection of the passage information includes the notification indicating the benefit of collecting the passage information, it is possible to increase a motivation of the user to collect the passage information and further prompt the collection of the passage information.

(7) A control method causing a computer configured to control a moving body to execute processing including:

acquiring recognition data of an external environment including a surrounding area of the moving body;

detecting, based on the recognition data of the external environment, a following moving body that follows the moving body;

searching, based on a current position of the moving body and passage information indicating a passage through which the moving body is movable, for a route from the current position to a predetermined parking position; and moving the moving body to the parking position along the found route, in which the processing further includes, when the following moving body is detected while the moving body is moving to the parking position along a first route, searching for a second route different from the first route, and, when the second route is found, moving the moving body to the parking position along the second route.

According to (7), when the following moving body is detected while the moving body is moving to the parking position along the first route, it is possible to search for the second route different from the first route and move the moving body to the parking position along the second route. Accordingly, when there is a following moving body, the route along which the moving body moves may be changed from the first route that may overlap a route of the following moving body to the second route, and movement control of the moving body may be performed in consideration of the following moving body. In addition, even when the following moving body is detected, it is possible to continue the movement of the moving body to the parking position, and thus it is possible to improve convenience for a user of the moving body.

(8) A control method causing a computer configured to control a moving body to execute processing including:

acquiring recognition data of an external environment including a surrounding area of the moving body;

detecting, based on the recognition data of the external environment, a following moving body that follows the moving body;

searching, based on a current position of the moving body and passage information indicating a passage through which the moving body is movable, for a route from the current position to a predetermined parking position; and assisting in moving the moving body to the parking position along the found route, in which the processing further includes, when the following moving body is detected while the moving body is moving to the parking position along a first route, searching for a second route different from the first route, and, when the second route is found, assisting in moving the moving body to the parking position along the second route.

According to (8), when the following moving body is detected while the moving body is moving to the parking position along the first route, it is possible to search for the second route different from the first route and assist in moving the moving body to the parking position along the second route. Accordingly, when there is a following moving body, the route along which the moving body moves may be changed from the first route that may overlap a route of the following moving body to the second route, and movement assistance of the moving body may be performed in consideration of the following moving body. In addition, even when the following moving body is detected, it is possible to continue the movement assistance of the moving body to the parking position, and thus it is possible to improve convenience for a user of the moving body.

(9) A non-transitory computer-readable storage medium storing a program causing a computer configured to control a moving body to execute processing including:

acquiring recognition data of an external environment including a surrounding area of the moving body;

detecting, based on the recognition data of the external environment, a following moving body that follows the moving body;

searching, based on a current position of the moving body and passage information indicating a passage through which the moving body is movable, for a route from the current position to a predetermined parking position; and moving the moving body to the parking position along the found route, in which the processing further includes, when the following moving body is detected while the moving body is moving to the parking position along a first route, searching for a second route different from the first route, and, when the second route is found, moving the moving body to the parking position along the second route.

According to (9), when the following moving body is detected while the moving body is moving to the parking position along the first route, it is possible to search for the second route different from the first route and move the moving body to the parking position along the second route. Accordingly, when there is a following moving body, the route along which the moving body moves may be changed from the first route that may overlap a route of the following moving body to the second route, and movement control of the moving body may be performed in consideration of the following moving body. In addition, even when the following moving body is detected, it is possible to continue the movement of the moving body to the parking position, and thus it is possible to improve convenience for a user of the moving body.

(10) A non-transitory computer-readable storage medium storing a program causing a computer configured to control a moving body to execute processing including:

acquiring recognition data of an external environment including a surrounding area of the moving body;

detecting, based on the recognition data of the external environment, a following moving body that follows the moving body;

searching, based on a current position of the moving body and passage information indicating a passage through which the moving body is movable, for a route from the current position to a predetermined parking position; and assisting in moving the moving body to the parking position along the found route, in which the processing further includes, when the following moving body is detected while the moving body is moving to the parking position along a first route, searching for a second route different from the first route, and, when the second route is found, assisting in moving the moving body to the parking position along the second route.

According to (10), when the following moving body is detected while the moving body is moving to the parking position along the first route, it is possible to search for the second route different from the first route and assist in moving the moving body to the parking position along the second route. Accordingly, when there is a following moving body, the route along which the moving body moves may be changed from the first route that may overlap a route of the following moving body to the second route, and movement assistance of the moving body may be performed in consideration of the following moving body. In addition, even when the following moving body is detected, it is possible to continue the movement assistance of the moving body to the parking position, and thus it is possible to improve convenience for a user of the moving body.

What is claimed is:

1. A moving body control device configured to control a moving body, comprising:
 a processor configured to;
  acquire recognition data of an external environment including a surrounding area of the moving body;
  detect, based on the recognition data of the external environment, a following moving body that follows the moving body;
  search, based on a current position of the moving body and passage information indicating a passage through which the moving body is movable, for a route from the current position to a predetermined parking position; and
  move the moving body to the parking position along the found route, wherein
 when the following moving body is detected while the moving body is moving to the parking position along a first route, the processor is further configured to search for a second route different from the first route,
 when the second route is found, the processor is further configured to move the moving body to the parking position along the second route,
 the processor is further configured to store, in a storage, information indicating a passage detected based on the recognition data of the external environment as the passage information,
 the processor is further configured to search for the route based on the passage information stored in the storage, and
 when no second route is found as a result of the search for the second route, the processor is further configured to perform a notification to prompt a user of the moving body to collect the passage information.

2. The moving body control device according to claim 1, wherein
 the second route is a route along which the moving body is moved to the parking position after circulation in a surrounding area of the parking position.

3. The moving body control device according to claim 1, wherein
 the notification includes a notification prompting movement of the moving body in the surrounding area of the parking position.

4. The moving body control device according to claim 1, wherein,
 the notification includes a notification indicating a benefit of collecting the passage information.

5. A moving body control device configured to control a moving body, comprising:
 a processor configured to:
  acquire recognition data of an external environment including a surrounding area of the moving body;
  detect, based on the recognition data of the external environment, a following moving body that follows the moving body;
  search, based on a current position of the moving body and passage information indicating a passage through which the moving body is movable, for a route from the current position to a predetermined parking position; and
  assist in moving the moving body to the parking position along the found route, wherein
 when the following moving body is detected while the moving body is moving to the parking position along a first route, the processor is further configured to search for a second route different from the first route,
 when the second route is found, the control unit assists processor is further configured to assist in moving the moving body to the parking position along the second route,
 the processor is further configured to store, in a storage, information indicating a passage detected based on the recognition data of the external environment as the passage information,
 the processor is further configured to search for the route based on the passage information stored in the storage, and
 when no second route is found as a result of the search for the second route, the processor is further configured to perform a notification to prompt a user of the moving body to collect the passage information.

6. The moving body control device according to claim 5, wherein
 the second route is a route along which the moving body is moved to the parking position after circulation in a surrounding area of the parking position.

7. The moving body control device according to claim 5, wherein
 the notification includes a notification prompting movement of the moving body in the surrounding area of the parking position.

8. The moving body control device according to claim 5, wherein,
 the notification includes a notification indicating a benefit of collecting the passage information.

9. A control method causing a computer configured to control a moving body to execute processing comprising:
 acquiring recognition data of an external environment including a surrounding area of the moving body;
 detecting, based on the recognition data of the external environment, a following moving body that follows the moving body;
 searching, based on a current position of the moving body and passage information indicating a passage through which the moving body is movable, for a route from the current position to a predetermined parking position; and
 moving the moving body to the parking position along the found route, wherein the processing further comprising
  when the following moving body is detected while the moving body is moving to the parking position along a first route, searching for a second route different from the first route,
  when the second route is found, moving the moving body to the parking position along the second route,
  storing, in a storage, information indicating a passage detected based on the recognition data of the external environment as the passage information, searching for the route based on the passage information stored in the storage, and when no second route is found as a result of the search for the second route, performing a notification to prompt a user of the moving body to collect the passage information.

10. A non-transitory computer-readable storage medium storing a program causing a computer configured to control a moving body to execute processing comprising:

acquiring recognition data of an external environment including a surrounding area of the moving body;

detecting, based on the recognition data of the external environment, a following moving body that follows the moving body;

searching, based on a current position of the moving body and passage information indicating a passage through which the moving body is movable, for a route from the current position to a predetermined parking position; and moving the moving body to the parking position along the found route, wherein the processing further comprising when the following moving body is detected while the moving body is moving to the parking position along a first route, searching for a second route different from the first route, when the second route is found, moving the moving body to the parking position along the second route, storing, in a storage, information indicating a passage detected based on the recognition data of the external environment as the passage information, searching for the route based on the passage information stored in the storage, and when no second route is found as a result of the search for the second route, performing a notification to prompt a user of the moving body to collect the passage information.

* * * * *